US007516475B1

(12) United States Patent
Chen et al.

(10) Patent No.: US 7,516,475 B1
(45) Date of Patent: Apr. 7, 2009

(54) METHOD AND APPARATUS FOR MANAGING SECURITY POLICIES ON A NETWORK

(75) Inventors: Shigang Chen, Santa Clara, CA (US); Liman Wei, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 827 days.

(21) Appl. No.: 10/187,719

(22) Filed: Jul. 1, 2002

(51) Int. Cl.
G06F 15/16 (2006.01)
H04L 9/32 (2006.01)

(52) U.S. Cl. ............................................ 726/1; 726/14
(58) Field of Classification Search ................ 715/517, 715/526, 790, 797; 345/418, 628, 635; 726/1, 726/14
See application file for complete search history.

(56) References Cited

U.S. PATENT DOCUMENTS

| 5,060,170 | A | * | 10/1991 | Bourgeois et al. ............ 715/788 |
| 5,377,317 | A | * | 12/1994 | Bates et al. .................. 715/789 |
| 5,390,295 | A | * | 2/1995 | Bates et al. .................. 715/789 |
| 5,481,700 | A | | 1/1996 | Thuraisingham |
| 5,487,143 | A | * | 1/1996 | Southgate .................... 715/790 |
| 5,859,966 | A | | 1/1999 | Hayman et al. |
| 5,889,958 | A | * | 3/1999 | Willens ....................... 709/229 |
| 5,999,179 | A | | 12/1999 | Kekic et al. |
| 6,105,027 | A | * | 8/2000 | Schneider et al. ............... 707/9 |
| 6,167,445 | A | * | 12/2000 | Gai et al. ..................... 709/223 |
| 6,170,012 | B1 | * | 1/2001 | Coss et al. .................... 709/229 |
| 6,216,140 | B1 | | 4/2001 | Kramer |
| 6,347,376 | B1 | * | 2/2002 | Attwood et al. ................. 726/1 |
| 6,484,261 | B1 | * | 11/2002 | Wiegel ........................ 726/11 |
| 6,754,832 | B1 | * | 6/2004 | Godwin et al. ................ 726/14 |
| 6,826,698 | B1 | * | 11/2004 | Minkin et al. .................. 726/1 |
| 6,880,005 | B1 | * | 4/2005 | Bell et al. .................... 709/225 |
| 6,920,558 | B2 | * | 7/2005 | Sames et al. ................. 713/166 |
| 2002/0093527 | A1 | | 7/2002 | Sherlock et al. |
| 2002/0186260 | A1 | | 12/2002 | Young |
| 2003/0070084 | A1 | | 4/2003 | Satomaa et al. |
| 2003/0110192 | A1 | | 6/2003 | Valente et al. |
| 2006/0167858 | A1 | * | 7/2006 | Dennis et al. .................. 707/3 |

OTHER PUBLICATIONS

Kim, S., Kim, M., Kim, K., and Jang, J. 2002. Information Model for Policy-Based Network Security Management. In Revised Papers From the international Conference on information Networking, Wireless Communications Technologies and Network Applications-Part 1 (Jan. 30-Feb. 1, 2002). I. Chong, Ed. Lecture Notes In Computer Science, vol. 2343.*

* cited by examiner

Primary Examiner—Christopher A Revak
Assistant Examiner—Matthew T Henning
(74) Attorney, Agent, or Firm—Hickman Palermo Truong & Becker LLP (57) ABSTRACT

Security policies that regulate communication packets on a network may be segmented into independent sets, where each security policy of an independent set does not regulate communication packets other than those defined for that set. A management algorithm is performed separately for each independent set, rather than for all of the security policies together.

33 Claims, 3 Drawing Sheets

METHOD AND APPARATUS FOR MANAGING SECURITY POLICIES ON A NETWORK

FIELD OF THE INVENTION

The present invention generally relates to network security. The invention relates more specifically to a method and apparatus for managing security policies on a network.

BACKGROUND OF THE INVENTION

It is computationally intensive to manage security for large-scale networks. When the number of security policies is very large, it can take hours to process and install security policies on select security devices. Activities for managing the security policies can become similarly computationally intensive. Such management activities may also be cumulative, so that the time needed to complete the management activities increases over time with the size and complexity of the network.

Many algorithms used to add new security devices, or to optimize security devices on an existing network, are sufficiently complex that the time needed to execute such algorithms is unfavorably disproportionate to the number of security devices on the network topology. For example, many algorithms have a time complexity of $O(n^2)$ or higher, where n corresponds to the number of security policies. Executing the algorithms with the time complexity of $O(n^2)$ is often the best that can be achieved for many existing networks. The result is that there is a tendency to manage security policies less frequently, so that security policies are often maintained on the network in a less than optimal state.

Due to the complexity of the management algorithms, the computation resources required for managing security devices on networks can be cumbersome and excessive. Several minutes or even hours can be dedicated to managing security policies on the network, making implementation of the management algorithms inefficient for the network.

Based on the foregoing, there is a need for a way to simplify the manner in which management operations are performed. There is a specific need for improving performance when implementing management operations.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

BRIEF DESCRIPTION OF THE DRAWINGS

The present invention is illustrated by way of example, and not by way of limitation, in the figures of the accompanying drawings and in which like reference numerals refer to similar objects and in which.

DETAILED DESCRIPTION OF THE PREFERRED EMBODIMENT

A method and apparatus for managing security policies on a network are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 OVERVIEW
  1.1 TERMINOLOGY
2.0 FUNCTIONAL OVERVIEW
3.0 MANAGING SECURITY DEVICES USING SECURITY DOMAINS
4.0 EXAMPLES OF HOW EMBODIMENTS MAY BE EMPLOYED
5.0 IMPLEMENTATION ARCHITECTURE
6.0 HARDWARE OVERVIEW
7.0 CONCLUSION

1.0 Overview

Security policies that regulate traffic on a network may be segmented into independent sets. The independent sets of security policies are defined so that any security policy in an independent set does not regulate communication packets other than those defined for that independent set. A management algorithm is performed separately for each independent set. The result of performing the management algorithm is the same as if the management algorithm was performed for all of the security policies together.

In one example, the security policies that configure security devices may be segmented into m sets. An algorithm to manage the security devices of the network may be executed in its entirety on each of the m sets. A result of executing the algorithm separately on the m independent sets is substantially equivalent to executing the algorithm on all of the security policies together. Consequently, the performance of executing the management algorithm is improved considerably.

According to an embodiment, security devices on a network are managed by identifying a plurality of independent sets of security policies on the network. Each independent set of security policies includes one or more security policies that configure one or more security devices on the network. A set of operations are performed separately on each of the independent sets of security policies in order to manage the security devices on the network. A result of performing the set of operations separately on each of the independent sets of security policies is substantially equivalent to a result of performing the set of operations on the security policies without regard for the independent sets of security policies.

According to one embodiment, independent sets of security policies may be associated with non-overlapping domains on a network. For example, independent sets of security policies may be associated with security domains, which include network objects completely surrounded by security devices on a network.

1.1 Terminology

An "independent set of security policies" includes one or more security policies that are independent of any other security policy that is excluded from the set. Two security policies are independent if the two security policies do not overlap with one another. In other words, traffic regulated by one security policy is not also regulated by the other security policy.

A "result" of performing an algorithm or a set of operations refers to the effect that execution of the algorithm or the set of operations has on the security policies. For example, the result may refer to the number of distinct security policies in operation after the operations are performed, as well as to the syntax and semantics of each of the security policies in effect after the operations are performed. In one embodiment, two results are substantially equivalent if each result refers to the same number of security policies, and if each of the security policies referred to by the result have the same semantics.

The term "substantially" refers to a correlation of 90% or more between two quantities. Therefore, two results are substantially equivalent if there is a 90% correlation between the security policies referenced by each result. Better quantitative correlations (such as 95% or 99%) may also be included in the meaning or "substantially equivalent".

Embodiments of the invention permit management operations to be performed more quickly and efficiently on networks having large numbers of security policies. Under known techniques, certain operations for managing security policies on a network require durations of time that are on the order of $O(n^2)$ or more, where n represents the number of security policies on the network. Certain embodiments of the invention enable the durations of time required by those same operations to be reduced by one or more orders of magnitude. For example, an algorithm that would otherwise take 10000 seconds could take 1000 seconds when certain embodiments of the invention are employed.

A domain on a network is a set of one or more network objects. Two or more domains are said to be "non-overlapping" if security policies associated with one domain are independent of security policies associated with the other domain.

2.0 Functional Overview

Figure 1:
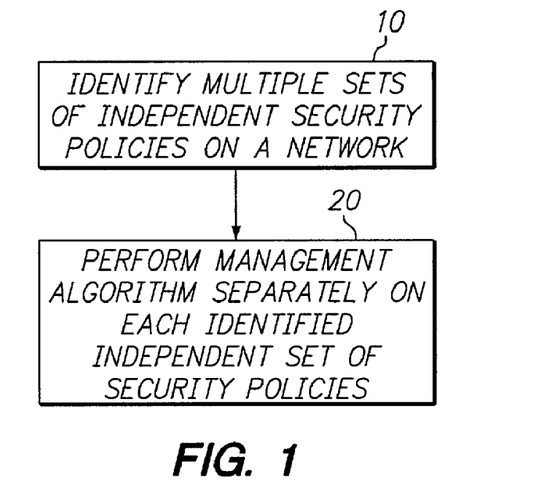
FIG. 1 illustrates a method for managing security devices on a network.

FIG. 1 illustrates a method for managing security devices on a network, under an embodiment of the invention. A method such as shown in FIG. 1 assumes a network having one or more firewalls or other security devices. Each security device may be managed by one or more security policies. The security policies may regulate communications to and from objects on the network.

An embodiment such as described with FIG. 1 enables operations and algorithms for managing security devices on a network to be more readily executable. Example management algorithms analyze security policies for purpose of determining if any of the security policies are redundant, overlapping, or in conflict. The management algorithms may also perform optimization functions, such as removing security policies that are determined to be redundant, combining overlapping security policies, and resolving conflicting security policies. The ability to perform such management operations becomes more difficult as the number of security policies on the network increases.

In step 10, security policies of a network are grouped into independent sets. Each security policy may be used by security devices on the network to regulate communications to and from specific network objects specified by that security policy. Multiple independent sets of security policies may result from grouping the security policies. Communications that are regulated by one independent set of security policies are not regulated by another set of independent security policies.

Various techniques may be employed to group security policies into independent sets. The use of different techniques may result in identifying different independent sets of security policies. One technique described in Section 3.0 identifies security domains on a network. Security policies that regulate communications between the same security domains are identified as belonging to the same independent set of security policies. In general, grouping refers to creating and storing appropriate values or data structures in memory.

Another technique for identifying independent sets of security policies is to select dimensional ranges of data packets that are regulated by the security devices on the network. Security policies that address the same selected dimensional ranges are identified as one independent set of security policies. Examples of dimensional ranges that may be used to identify independent sets of security policies include a source address range, a destination address range, a source port range, a destination port range, and a protocol of all the data packets that can be made subject to the security policies being considered. For example, each independent set of security policies may be defined by certain dimensional ranges. The data packets regulated by each security policy in an independent set of security policies will be encompassed by the dimensional ranges associated with that independent set.

In step 20, a management algorithm is executed separately on each of the multiple independent sets of security policies. One characteristic of the management algorithm is that a result of performing the management algorithm separately on each independent set of security policies is substantially equivalent to a result of performing the management algorithm without regard for any of the independent sets of security policies. In other words, the properties of the management algorithm are such that a result of performing step 20 after step 10 is substantially equivalent to performing step 20 on all policies, rather than on sets, without ever performing step 10. Not all management algorithms and operations have this characteristic. Examples of management algorithms that can be executed separately on independent sets of security policies include optimization algorithms to remove redundancy amongst security policies on a network, and algorithms that compare one list of security policies with another list of security policies in order to combine two or more security policies.

Another characteristic of the sequence of operations is that a performance characteristic of performing the sequence of operations separately on multiple sets of independent security policies is improved, as compared to performing the sequence of operations on the security policies without regard for grouping the independent sets of security policies into independent sets. In particular, a set of management operations that are performed separately on independent sets of security policies may be executed and completed one or more orders of magnitude faster in comparison to those same operations being performed without grouping the security policies into independent sets.

The number of independent sets of security policies may be selected by an administrator or user of the network based on a desired performance gain. In general, management operations may be performed faster by increasing the number of independent sets of security policies, while reducing the number of security policies in each of the independent sets.

Steps such as recited in FIG. 1 may be computer-implemented steps or combinations of operations, performed by one or more computer programs or other software elements.

In other embodiments, steps 10 and 20 are performed in hardware or in combinations of hardware and software.

3.0 Managing Security Devices Using Security Domains

Figure 2:
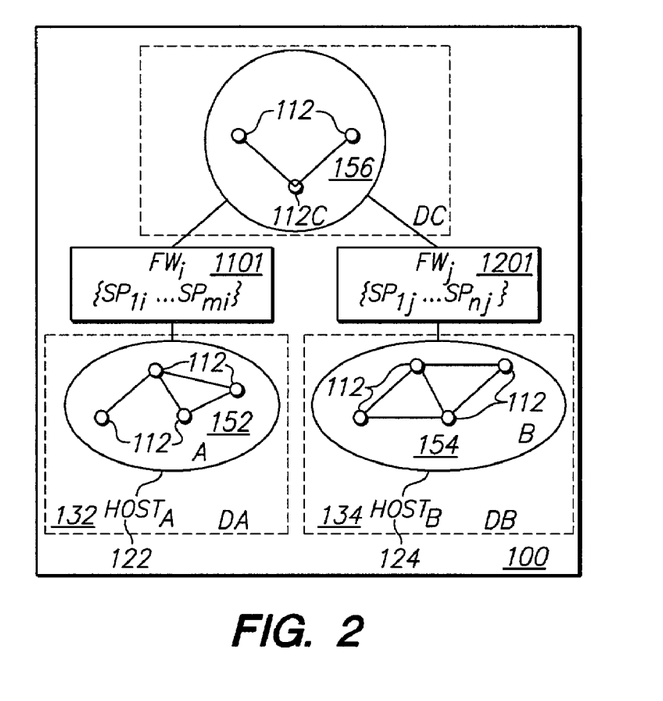
FIG. 2 illustrates a network with security domains that are defined for purpose of managing security policies.

FIG. 2 illustrates an example network with example security domains that are defined for purpose of managing security policies, under an embodiment of the invention. A network 100 as shown and described by FIG. 1 may include multiple network objects 112 that are interconnected to one another. Network objects 112 may comprise routers, switches, hubs etc. A first firewall 110 and a second firewall 120 may regulate communications to and from the objects 112 on different portions of network 100. A first host 122 (Host A) and second host 124 (Host B) may connect to network 100.

A plurality of security policies configure first firewall 110 and second firewall 120 to regulate traffic to and from various objects 112 on network 100. The security policies may be specified by an administrator of network 100. In an example provided by FIG. 1, first firewall 110 is configured by the set of security policies ($SP_{1i}$ ... $SP_{mi}$), and the second firewall 120 is configured by the set of security policies ($SP_{1j}$ ... $SP_{nj}$). Over time, the security policies that configure each of first firewall 110 and second firewall 120 become more complex, so that security policies may overlap, conflict or become redundant. Management algorithms may be implemented on the security policies of network 100 in order to reduce redundant security policies, combine security policies, or resolve conflicting security policies. However, such algorithms become more difficult to execute as the number of security policies that configure each of the firewalls 110 120 increases.

In an embodiment, the security policies that configure each of the firewalls 110, 120 are entries of one or more access control lists (ACLs). Each firewall 110 and 120 may be associated with one or more ACLs having entries that configure that firewall. Each ACL may be considered a security policy of network 100. The ACL entries may specify dimensions of communication packets that are to be regulated.

In an embodiment, the dimensions specified by each ACL entry include a source address range and a destination address range. When only these two dimensions are considered, the entry regulates communication packets that (i) originate from an address within a given entry's source address range, and (ii) are destined for a destination encompassed by the given entry's destination address range. In other embodiments, an ACL entry may utilize additional dimensions to specify communication packets that are to be regulated by that entry. Other dimensions that may be used to specify what communication packets are regulated by a given ACL entry include a source port range, a destination port range, and a communication protocol. Thus, a given communication packet may be associated with one or more ACL entries based on its dimensions.

The ACL entries may be specified by the administrator of network 100. Over the course of time, entries may be added and deleted without examination of the existing entries, so that the entries of different ACLs may overlap, become redundant or even in conflict. Management operations may be executed on network 100 to remove redundant ACL entries, combine overlapping entries, and resolve conflicting entries. In many cases, the duration for management operations to be executed on a given number of ACL entries is of the order of $O(n^2)$ or more, where n represents the given number of ACL entries. If n represents all of the ACL entries on a network, then the duration for executing the management operations may be lengthy.

Embodiments of the invention enable the ACL entries to be grouped, so that subsequent execution of management operations is performed on groups of ACL entries, where n would then represent the number of ACL entries in a given group. The groupings of the ACL entries are selected so that a result of executing the management operations on each group individually is substantially equivalent if the management operations on all of the ACL entries on the network 100, without grouping the ACL entries. In other words, the groupings of ACL entries are selected so that the following relationship holds:

$$F(n_1)+F(n_2)+\ldots F(n_1)=R=F(n) \quad (1)$$

where F represents the management operations having an order of complexity of $O(n^2)$ or more;

n represents the total number of ACL entries on the portion of the network being managed;

$n_1, n_2, \ldots n_1$ are each groupings of ACL entries, and where the sum of $n_1+n_2+\ldots n_1$ is equal to n; and R represents the result of performing the management operations on the given ACL entries.

When the relationship (1) holds, the fact that the management operations are of the order of $O(n^2)$ in complexity means that the left hand side of relationship (1) may be performed one or more orders of magnitude faster than the right hand side. For example, suppose there are 1,000 ACL entries being considered for management operations on network 100, so that a duration of performing F(n) is $1000*1000=10^6$. If the ACL entries are grouped into 10 independent sets of equal size, then a duration for performing F(n) on each independent set is $100*100=10^4$. If there are 10 independent sets of entries, then the duration for processing the ACL entries is $10*10^4=10^5$, or ten times faster than if no independent sets are identified amongst the ACL entries. Similarly, if 100 independent sets of ACL entries are identified, a duration for performing F(n) will be one hundred times faster than if no independent sets of ACL entries are identified.

As explained with FIG. 1, ACL entries are grouped by identifying sets of independent ACL entries. In other words, dimensions of communication packets regulated by each ACL entry in any one independent set of ACL entries do not overlap dimensions of communication packets regulated by ACL entries excluded from that independent set. Two independent sets of ACL entries will not regulate any communication packets having the same dimensions.

In an example such as shown by FIG. 2, groups of ACL entries are identified by first identifying security domains on the network. A security domain is a portion of a network that is completely surrounded by firewalls or other security devices. In other words, a security domain is separated from all other objects in the network by one or more security devices. For example, in FIG. 2, first firewall 110 and second firewall 120 effectively divide the network 100 into three security domains. The first domain 132 includes first host 122, and network objects 112 in first sub-network 152. The second domain 134 includes second host 124, and network objects 112 in second sub-network 154. The third domain 136 includes third sub-network 156. Every network object 112 belongs to only one security domain.

In one embodiment, ACL entries may be grouped in the same independent set if each entry has a same source domain and a same destination domain. The source domain of a given ACL entry is the domain to which a source object of the ACL entry belongs. Likewise, its destination domain is the domain that the destination object belongs to. ACL entries having the same source domain and destination domain may be grouped into an independent set. Two ACL entries with different source or destination domains do not overlap because their respective source and/or destination objects belong to different domains. As an example, each ACL entry associated with first firewall 110 having a source domain as first domain 152 and a destination domain as second domain 154 may be grouped in the same independent set.

When ACL entries are grouped into independent sets, management operations may be performed with better performance characteristics. In particular, management operations may be performed an order of magnitude or more faster by grouping ACL entries into independent sets, as compared to performing management operations on ungrouped ACL entries of network 100.

Figure 3:
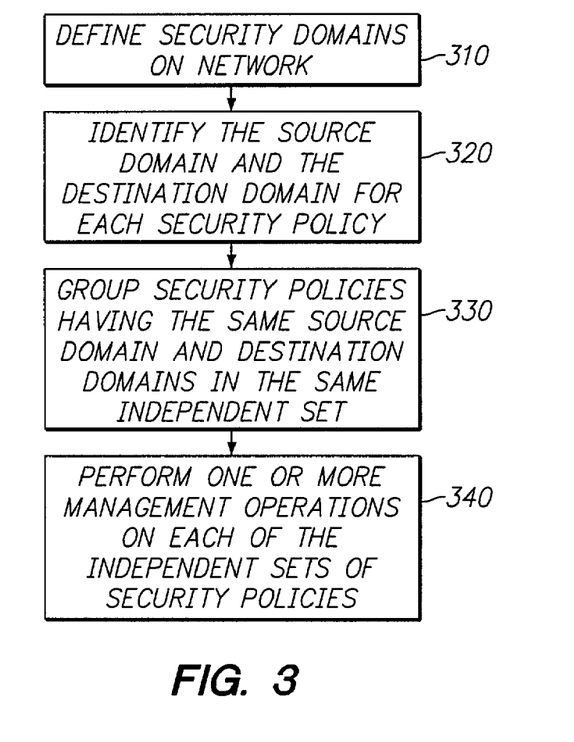
FIG. 3 illustrates a method for using security domains to perform one or more operations to manage security policies of a network.

FIG. 3 illustrates a method for using security domains to perform one or more operations to manage security policies of a network, under an embodiment of the invention.

In step 310, security domains are defined on the network. Each security domain comprises a set of network objects that are surrounded by firewalls. Except for one or more firewalls, none of the network objects in the security domain are in direct communication with objects outside of that domain. An example of security domains is shown in FIG. 2, with first security domain 152, second security domain 154, and third security domain 156.

In step 320, the source domain and the destination domain are identified for each security policy that is to be subjected to the management operations. Each security policy may specify communication packets that originate from a source object and are destined for a destination object. For a given security policy, the security domain that has the source object is the source domain for that security policy, and the security domain that has the destination object is the destination domain for that security policy.

Step 330 provides that security policies having the same source domain and destination domains are grouped together in sets. Each set is an independent set of security policies. As a result, no data packets regulated by security policies in one independent set will be regulated by security policies outside of that independent set.

In step 340, one or more management operations are performed on each of the independent sets of security policies. A result of performing the one or more management operations on each of the independent sets of security policies will be the same as if the same management operations are performed on all of the security policies without regard for grouping the security policies into independent sets. The overall performance of the management operations will be improved.

The management operations may, for example, serve to remove redundant security policies, combine overlapping security policies, and resolve conflicts amongst two or more security policies.

In an embodiment, management operations performed in step 340 may be executed on two or more independent sets of security policies concurrently. This may further improve the performance of performing the management operations.

Steps such as recited with FIG. 3 may be computer-implemented steps or combinations of operations, performed by one or more computer programs or other software elements.

In other embodiments, steps 310-340 are performed in hardware or in combinations of hardware and software.

4.0 Examples of how Embodiments May be Employed

The following simple example may be used to illustrate how embodiments of the invention may be employed. A list of four security policies may be provided in the form of ACL entries, described below:

A) permit http from Domain A to Domain C

B) permit http from Domain B to Domain C

C) permit http from Host A to Domain C

D) permit http from Host B to Domain C

One manner in which the list of security policies may be optimized is to inspect the security policies and remove policies that are redundant. An algorithm for locating redundant security policies requires each security policy to be compared with all other policies to see if the security policy is completely covered by one or more other security policies. If the result of this analysis is that one security policy is covered by one or more other policies, then that security policy may be removed. If independent sets of security policies are not identified from the list, then six total comparisons will need to be made to determine if any redundant entries exist.

According to embodiments of the invention, the list of security policies may be grouped into independent sets. In an embodiment such as described with FIGS. 2 and 3, this may be done using security domains. Policies A and C may be grouped into one independent set because their respective sources are in the security domain A, and their respective destinations are in security domain B. Likewise, policies B and D may be grouped into the same independent set for the same reason. It takes on comparison in the first independent set to determine that policy C is redundant, and can be removed. It takes another comparison in the second independent set to determine that policy D is redundant and can be removed. No comparison needs to be made between the independent sets because it is known that the security policies in independent sets do not overlap.

By grouping the security policies into independent sets, two comparisons are made to identify two redundant security policies. Without grouping the security policies, six comparisons were required to identify the same two redundant security policies. Thus, the example illustrates how embodiments of the invention may be implemented to achieve a result (the removal of two redundant security policies) that is substantially similar to the result that would be received if no grouping was to take place. But embodiments of the invention achieve the result with much better performance (a savings of four comparisons).

The following is another example of how embodiments of the invention may be employed. Another algorithm for managing security policies involves the concept of using one list of ACL entries to filter a second list of ACL entries. Given two lists of ACL entries, the management algorithm compares one list of entries with another list of entries for purpose of removing redundant entries on one of the lists. Given the following two lists:

First List:

A) permit telnet from Domain A to Domain C

B) permit telnet from Domain B to Domain C

C) permit telnet from Domain B to Domain A

D) permit telnet from Domain B to Domain C

Second List:

E) permit telnet from Host B to Domain C

The management algorithm may be used to compare every ACL entry in the second list with every ACL entry in the first list to see if two entries are equivalent. Therefore, if no grouping of ACL entries is to take place, then four comparisons will be needed to determine if any ACL entries in the first list match policy E.

According to an embodiment of the invention, ACL entries in the first list and in the second list may be grouped into independent sets to significantly reduce the number of comparisons that are needed. As shown, policy D and E may be grouped into one independent set. Therefore, only policy E and policy D need to be compared to one another in order to determine if policy E is redundant. Other ACL entries are not in the same independent set as policy E, and thus do not overlap policy E. Therefore, policy E does not need to be compared with those other ACL entries in the first list.

As shown with the second example, embodiments of the invention may significantly reduce the number of computations necessary to perform a management algorithm. Specifically, the management algorithm may be performed on ACL entries grouped into independent sets in order to achieve the same result as if the ACL entries are not grouped together-that result being the removal of policy E. Furthermore, by grouping the ACL entries into independent sets, performance of the management algorithm is improved. The result of the management algorithm may be achieved in one comparison step as opposed to four comparison steps.

5.0 Implementation Architecture

Figure 4:
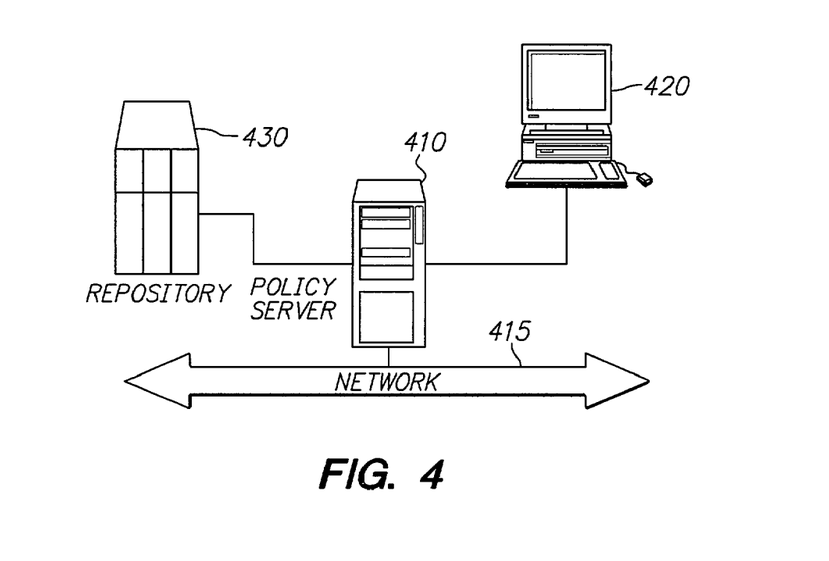
FIG. 4 is a block diagram showing a system for managing security policies on a network.

FIG. 4 is a block diagram showing a system for managing security policies on a network. The system includes a policy server 410 and a repository 430. The system also includes a terminal 420 to operate policy server 410. The policy server 410 may access network 100 (FIG. 2) through a network channel 415.

In an embodiment, policy server 410 executes instructions to identify independent sets of security policies on network 100 (FIG. 2). This may include executing instructions to identify sets and perform management operations such as described with FIG. 1, as well as to identify security domains, such as described with FIG. 3. In addition, policy server 410 may be used to execute one or more management operations separately on each identified independent set of security policies. The security policies may be stored in repository 430, firewalls and other security devices of network 100, and/or on any other device on or in communication with network 100.

6.0 Hardware Overview

Figure 5:
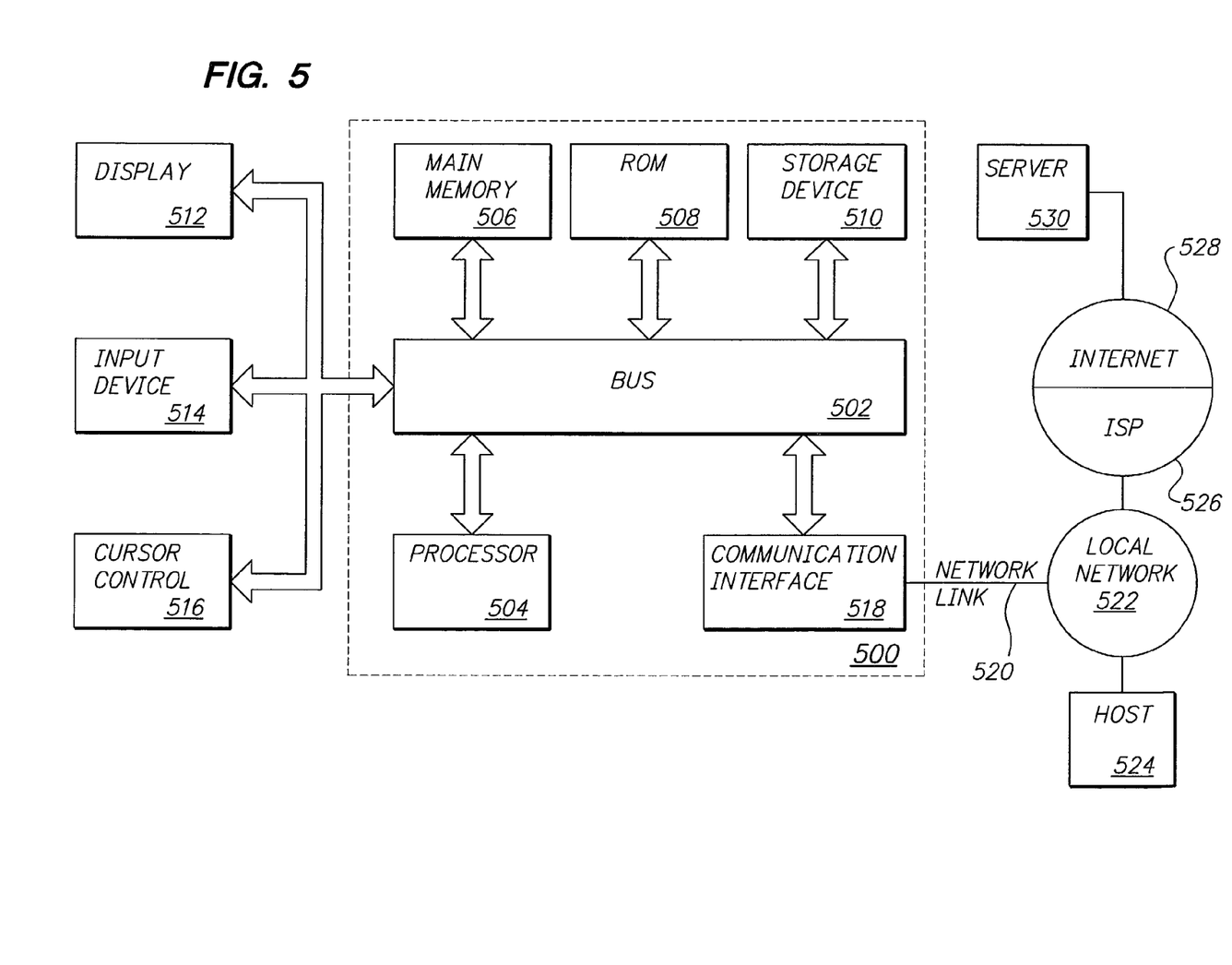
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for managing security policies on a network. According to one embodiment of the invention, management of security policies on a network may be provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for managing security policies on a network, as described herein.

The received code may be executed by processor 504 as it is received, and/or stored in storage device 510, or other non-volatile storage for later execution. In this manner, computer system 500 may obtain application code in the form of a carrier wave.

7.0 Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing one or more security devices on a network, the method comprising:

identifying a plurality of independent sets of security policies from a plurality of security policies on the network, wherein each security policy in the plurality of security policies defines how at least one of the one or more security devices regulates data packets that are communicated through the network;

wherein identifying a plurality of independent sets of security policies comprises:

creating and storing data representing a plurality of non-overlapping domains of devices in the network;

for each security policy, in the plurality of security policies identifying each of a source domain and destination domain from the plurality of non-overlapping domains; and creating and storing data representing each of the plurality of independent sets of security policies as one or more security policies that have a same source domain and a same destination domain; then performing a set of operations separately on each of the independent sets of security policies, wherein the set of operations is performed to manage the plurality of security devices, wherein a result of performing the set of operations separately on each of the independent sets of security policies is substantially equivalent to performing the set of operations on the plurality of security policies without previously identifying the plurality of independent sets of security policies from the plurality of security policies.

2. A method as recited in claim 1, wherein creating and storing data representing a plurality of non-overlapping domains of devices in the network includes identifying a portion of the network having one or more network objects that are separated from all other network objects in the network by one or more security devices.

3. A method as recited in claim 1, further comprising performing the set of operations separately on each of the independent sets of security policies, so that a performance criteria measured from performing the set of operations on each of the independent sets of security policies is improved in comparison to the performance criteria measured from performing the set of operations on the security policies of the network without previously identifying the plurality of independent sets of security policies.

4. A method as recited in claim 3, wherein performing the set of operations separately on each of the independent sets of security policies includes causing a performance time measured from performing the set of operations on each of the independent sets of security policies to be less than the performance time measured from performing the set of operations on the security policies of the network without previously identifying the plurality of independent sets of security policies.

5. A method as recited in claim 3, wherein performing the set of operations on each of the independent sets of security policies includes causing a performance time measured from performing the set of operations on each of the independent sets of security policies to be reduced by two or more orders of magnitude in comparison to the performance time measured from performing the set of operations on the security policies of the network without previously identifying the plurality of independent sets of security policies.

6. A method as recited in claim 1, wherein identifying a plurality of independent sets of security policies on the network includes associating one or more security policies in the plurality of security policies with one of the independent sets of security policies based on a source address range and a destination address range of the one or more security policies.

7. A method as recited in claim 1, wherein performing a set of operations includes inspecting one or more of the plurality of independent sets of security policies on the network to identify and eliminate security policies that are redundant.

8. A method as recited in claim 1, wherein performing a set of operations includes comparing a selection of security policies in one or more of the independent sets of security policies on the network to combine and reduce a total number of security policies in the selection.

9. A method as recited in claim 1, wherein performing a set of operations includes analyzing the addition of a one or more new security devices to the network, and reconfiguring at least some of the plurality of security policies to account for the one or more new security devices.

10. A method as recited in claim 1, wherein performing a set of operations separately on each of the independent sets of security policies includes performing the set of operations concurrently on two or more of the independent sets of security policies.

11. A method as recited in claim 1, wherein identifying a plurality of independent sets of security policies includes grouping one or more access control list entries into a plurality of independent sets of access control list entries.

12. A method for managing security devices on a network, the method comprising:
identifying a plurality of security domains on the network, each security domain including one or more network objects in which one or more security devices completely separate network objects of that security domain from all other network objects in the network that are excluded from that security domain;
grouping a plurality of security policies into a plurality of independent sets of security policies, each independent set of security policies including one or more security policies that each specify a source object and a destination object, the source object specified by the one or more security policies of each independent set of security policies being from a first security domain in the plurality of domains, the destination object specified by the one or more security policies of each independent set of security policies being from a second security domain in the plurality of domains; then
performing a set of operations separately on each of the independent sets of security policies, so that a result of performing the set of operations on all of the security policies in each of the independent sets of security policies is substantially equivalent to performing the set of operations on the plurality of security policies without previously grouping the plurality of security policies into the independent sets of security policies.

13. A method as recited in claim 12, wherein performing a set of operations separately on each of the independent sets of security policies includes performing the set of operations concurrently on two or more of the independent sets of security policies.

14. A method as recited in claim 12, wherein performing a set of operations separately on each of the independent sets of security policies includes causing a performance time measured from performing the set of operations on each of the independent sets of security policies to be less than the performance time measured from performing the set of operations on the security policies of the network without previously grouping the plurality of security policies into independent sets of security policies.

15. The method as recited in claim 12, wherein performing a set of operations includes inspecting one or more of the plurality of independent sets of security policies on the network to identify and eliminate security policies that are redundant.

16. The method as recited in claim 12, wherein performing a set of operations includes comparing a selection of security policies in one or more of the independent sets of security policies on the network to combine and reduce a total number of security policies in the selection.

17. A method as recited in claim 12, wherein performing a set of operations includes analyzing the addition of a one or more new security devices to the network, and reconfiguring at least some of the plurality of security policies to account for the one or more new security devices.

18. A method as recited in claim 12, wherein identifying a plurality of independent sets of security policies includes grouping one or more access control list entries into a plurality of independent sets of access control list entries.

19. A volatile or non-volatile computer readable storage medium for managing security policies on a network, the volatile or non-volatile computer readable storage medium carrying instructions for performing the steps of:
identifying a plurality of security domains on the network, each security domain including one or more network objects in which one or more security devices separate each network object of that security domain from all other network objects in the network that are excluded from that security domain;
grouping a plurality of security policies into a plurality of independent sets of security policies, each independent set of security policies including one or more security policies that each specify a source object and a destination object, the source object specified by the one or more security policies of each independent set of security policies being from a first security domain in the plurality of domains, the destination object specified by the one or more security policies of each independent set of security policies being from a second security domain in the plurality of domains; then
performing a set of operations separately on each of the independent sets of security policies, so that a result of performing the set of operations on all of the security policies in each of the independent sets of security policies is substantially equivalent to performing the set of operations on the plurality of security policies without previously grouping the plurality of security policies into the independent sets of security policies.

20. An apparatus communicatively coupled to one or more security devices in a network to manage security policies on the network, the apparatus comprising:
a processor;
a network interface that communicatively coupled the processor to the network to receive one or more flows of packets therefrom;
one or more sequences of instructions in the memory which, when executed by the processor, cause the processor to carry out the steps of:
identifying a plurality of security domains on the network, each security domain including one or more network objects in which one or more security devices completely separate network objects of that security domain from all other network objects in the network that are excluded from that security domain;
grouping a plurality of security policies into a plurality of independent sets of security policies, each independent set of security policies including one or more security policies that each specify a source object and a destination object, the source object specified by the one or more security policies of each independent set of security policies being from a first security domain in the plurality of domains, the destination object specified by the one or more security policies of each independent set of security policies being from a second security domain in the plurality of domains; then performing a set of operations separately on each of the independent sets of security policies, so that a result of performing the set of operations on all of the security policies in each of the independent sets of security policies is substantially equivalent to performing the set of operations on the plurality of security policies without previously grouping the plurality of security policies into the independent sets of security policies.

21. An apparatus as recited in claim 20, wherein the one or more sequences of instructions, when executed by the processor, cause the processor to perform a set of operations separately on each of the independent sets of security policies include instructions for performing the set of operations concurrently on two or more of the independent sets of security policies.

22. An apparatus as recited in claim 20, wherein the one or more sequences of instructions, when executed by the processor, cause the processor to perform a set of operations separately on each of the independent sets of security policies include instructions for causing a performance time measured from performing the set of operations on each of the independent sets of security policies to be less than the performance time measured from performing the set of operations on the security policies of the network without previously grouping the plurality of security policies into independent sets of security policies.

23. An apparatus as recited in claim 20, wherein the one or more sequences of instructions, when executed by the processor, cause the processor to perform a set of operations include instruction for inspecting one or more of the plurality of independent sets of security policies on the network to identify and eliminate security policies that are redundant.

24. An apparatus as recited in claim 20, wherein the one or more sequences of instructions, when executed by the processor, cause the processor to perform a set of operations include instruction for comparing a selection of security policies in one or more of the independent sets of security policies on the network to combine and reduce a total number of security policies in the selection.

25. An apparatus as recited in claim 20, wherein the one or more sequences of instructions, when executed by the processor, cause the processor to perform a set of operations include instruction for analyzing the addition of a one or more new security devices to the network, and reconfiguring at least some of the plurality of security policies to account for the one or more new security devices.

26. An apparatus as recited in claim 20, wherein the one or more sequences of instructions, when executed by the processor, cause the processor to identify a plurality of independent sets of security policies include instructions for grouping one or more access control list entries into a plurality of independent sets of access control list entries.

27. An apparatus communicatively coupled to one or more security devices in a network to manage security policies on the network, the apparatus comprising:

means for identifying a plurality of security domains on the network, each security domain including one or more network objects in which one or more security devices completely separate network objects of that security domain from all other network objects in the network that are excluded from that security domain;

means for grouping a plurality of security policies into a plurality of independent sets of security policies, each independent set of security policies including one or more security policies that each specify a source object and a destination object, the source object specified by the one or more security policies of each independent set of security policies being from a first security domain in the plurality of domains, the destination object specified by the one or more security policies of each independent set of security policies being from a second security domain in the plurality of domains; then means for performing a set of operations separately on each of the independent sets of security policies, so that a result of performing the set of operations on all of the security policies in each of the independent sets of security policies is substantially equivalent to performing the set of operations on the plurality of security policies without previously grouping the plurality of security policies into the independent sets of security policies.

28. An apparatus as recited in claim 27, wherein the means for performing a set of operations separately on each of the independent sets of security policies comprises means for performing the set of operations concurrently on two or more of the independent sets of security policies.

29. An apparatus as recited in claim 27, wherein the means for performing a set of operations separately on each of the independent sets of security policies comprises means for causing a performance time measured from performing the set of operations on each of the independent sets of security policies to be less than the performance time measured from performing the set of operations on the security policies of the network without previously grouping the plurality of security policies into independent sets of security policies.

30. An apparatus as recited in claim 27, wherein the means for performing a set of operations comprises means for inspecting one or more of the plurality of independent sets of security policies on the network to identify and eliminate security policies that are redundant.

31. An apparatus as recited in claim 27, wherein the means for performing a set of operations comprises means for comparing a selection of security policies in one or more of the independent sets of security policies on the network to combine and reduce a total number of security policies in the selection.

32. An apparatus as recited in claim 27, wherein the means for performing a set of operations comprises means for analyzing the addition of a one or more new security devices to the network, and reconfiguring at least some of the plurality of security policies to account for the one or more new security devices.

33. An apparatus as recited in claim 27, wherein the means for identifying a plurality of independent sets of security policies comprises means for grouping one or more access control list entries into a plurality of independent sets of access control list entries.

\* \* \* \* \*